Patented Aug. 26, 1924.

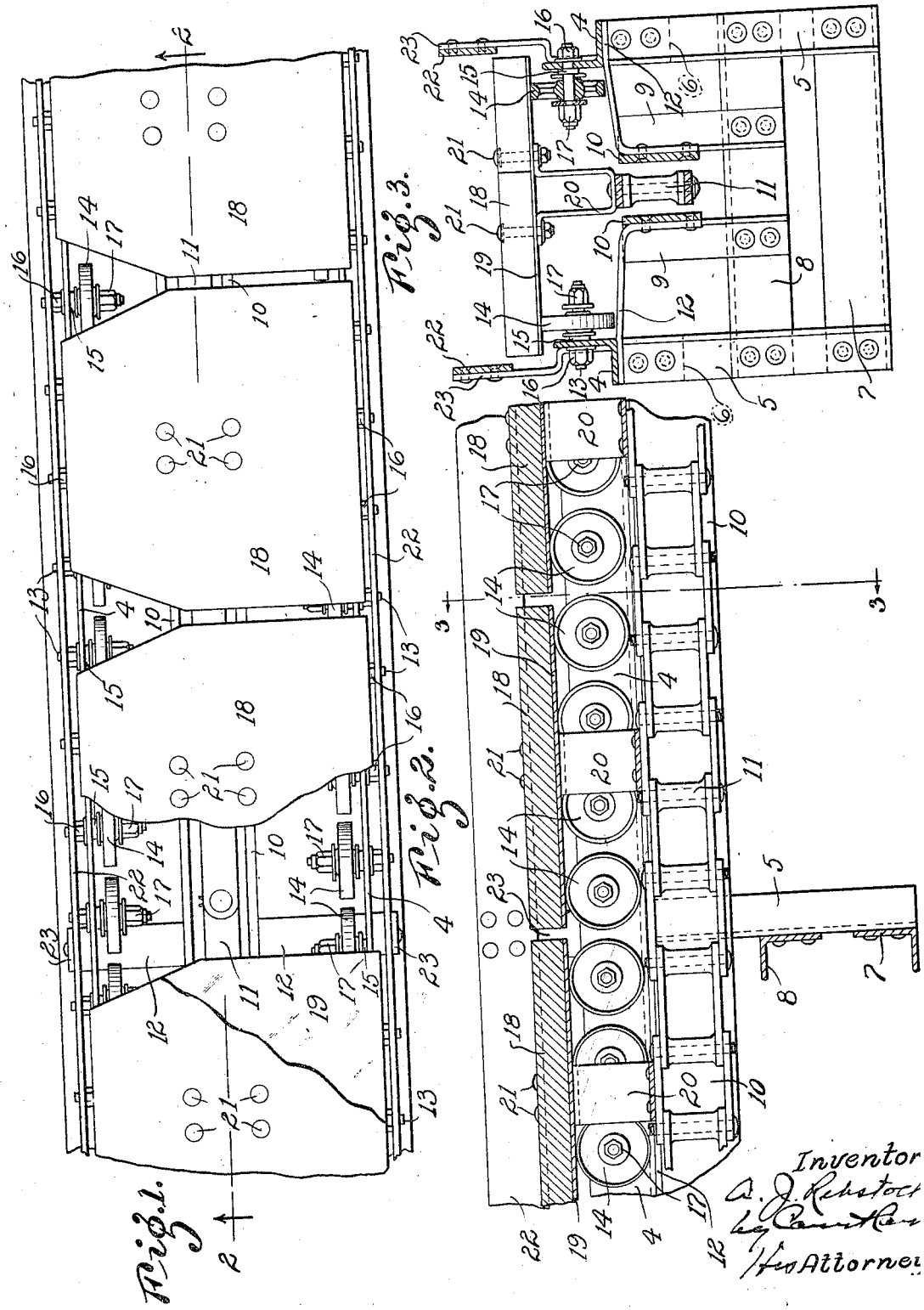

1,505,971

UNITED STATES PATENT OFFICE.

AUGUST J. REBSTOCK, OF ST. LOUIS, MISSOURI, ASSIGNOR TO ALVEY MANUFACTURING COMPANY, OF ST. LOUIS, MISSOURI, A CORPORATION OF MISSOURI.

CONVEYER.

Application filed July 11, 1921. Serial No. 483,751.

*To all whom it may concern:*

Be it known that I, AUGUST J. REBSTOCK, a citizen of the United States, and a resident of the city of St. Louis and State of Missouri, have invented a new and useful Improvement in Conveyers, of which the following is a specification.

This invention relates principally to endless power conveyers of the type commonly referred to as "carryalls" or "carrousels" for conveying heavy or bulky articles, such as cans containing milk or ice cream and trays containing bottles and has for its principal objects to reduce the friction between the article supporting elements and the parts over which said elements travel, to obtain an even continuous motion of the article supporting elements, to eliminate the use of castors for supporting said elements, to increase the number of supports for said elements and to simplify the construction and to reduce the cost of manufacture. The invention consists principally in the improved manner of supporting the article supporting elements; and it also consists in the combinations and arrangements of parts hereinafter described and claimed.

In the accompanying drawing, which forms part of this specification, and wherein like reference numerals refer to like parts wherever they occur, Fig. 1 is a plan view of a portion of an endless power conveyer embodying my invention, parts being broken away to more clearly illustrate the invention;

Fig. 2 is a vertical longitudinal section on the line 2—2 in Fig. 1; and

Fig. 3 is a vertical cross-section on the line 3—3 in Fig. 2.

The accompanying drawing illustrates a portion of one side of an endless conveyer, the ends and the opposite side of the conveyer being omitted. The frame of the conveyer is preferably constructed of angle irons and comprises a pair of horizontally extending spaced parallel angle iron side rails 4. The side rails 4 of the conveyer frame are disposed with their vertical flanges up and with their horizontal flanges down and facing outwardly. The side rails are supported at intervals throughout their length by pairs of oppositely disposed vertical members 5. The upper ends of the members 5 are secured to the bottom flanges of the side rails 4 by angle brackets 6 and are connected at their lower ends by a bottom cross-member 7.

Projecting upwardly from an intermediate cross-member 8, which is secured to the pair of vertical members 5, is a pair of vertical members 9. Secured to the opposing faces of the members 9 is a pair of spaced plates 10, which constitute guides for one stretch of an endless link chain 11, which passes around sprocket wheels (not shown) at the ends of the conveyer. The guide plates 10 are supported at intervals along their length by means of angle strips 12, which have one flange secured to the outer face of a guide plate and the other flange secured to the under side of the bottom flange of a side rail.

Journaled on horizontal studs 13, which extend through holes provided therefor in the upstanding vertical flanges of the side rails 4, are rollers 14. The studs 13 are provided with integral collar portions 15, which bear against the inner faces of the side rails 4, and are provided at the outer ends with nuts 16, whereby said studs may be firmly clamped to the upstanding flanges of said side rails. The rollers 14 are located along the inner faces of the side rails and are held on the studs by nuts 17. The studs are disposed in horizontal alinement at a height that will bring the upper surfaces of the rollers thereon above the tops of the side rails 4.

Supported on the rollers 14 are article supporting devices comprising blocks 18 of wood or other fibrous substance. Thin metallic wear plates 19 are secured to the under sides of the blocks 18, said plates being of a size and shape corresponding to the size and shape of said blocks. The blocks 18 are connected to the chain 11 by means of U-shaped brackets 20, whereby said blocks are adapted to be propelled by the chain over the bed of supporting rollers 14 and serve as a means for supporting said chain. The webs of the brackets 20 are riveted or otherwise rigidly secured to the uppermost links of the chain 11; and the spaced vertical branches of said brackets are provided at their upper ends with outwardly projecting horizontal portions which are rigidly secured to the middle portion of the blocks 18 by bolts 21.

Guard rails 22 extend longitudinally of the conveyer above the side rails 4 thereof and are supported from said side rails by vertical straps 23.

The rollers on one side rail are disposed opposite to the spaces between the rollers on the other side rail. This staggering of the supporting rollers results in a more equal distribution of the supporting points and eliminates the tendency of the blocks to tilt during the passing of the end portions thereof over the spaces between the rollers.

The use of the roller supports eliminates the necessity for supporting the blocks on tracks by means of castors, which bind and drag when traveling around the curved portion of the conveyer, and also enables the number of supporting points to be increased, whereby a smooth and even movement of said blocks over said supporting rollers is obtained. As shown in the drawing, the inner corners of the blocks 18 and the wear plates 19 are beveled or coped off to provide clearance between the inner corners of adjacent article supporting devices during their travel around the curved portions of the conveyer.

It is evident that modifications in the forms of the parts may be made and that the invention is not restricted to the precise forms shown in the drawing.

What I claim is:

1. A conveyer comprising spaced side rails and spaced guide members located therebelow, a chain running between said guide members, rollers journaled on said side rails, article supporting devices movable thereover, and means for connecting said article supporting devices with said chain, said means comprising U-shaped straps having their web portions secured to said chain and having their branches secured to the under sides of said article supporting devices.

2. A conveyer comprising spaced side rails and spaced guide members located therebelow, a chain running between said guide members, rollers journaled on said rails between the opposing faces thereof, article supporting devices resting on said rollers, said article supporting devices comprising blocks of fibrous substance having metallic plates attached to the bottoms thereof, and means for securing said article supporting devices to said chain, said means comprising U-shaped straps secured to said chain and to the under sides of said article supporting devices.

3. A conveyer comprising spaced side rails and spaced guide members located therebelow, studs projecting from the opposed surfaces of said side rails, rollers journaled on said studs, a chain running between said guide members, article supporting devices disposed between said side rails and resting on said rollers, and means for securing said chain to said article supporting devices, whereby said article supporting devices are adapted to be drawn over said rollers by said chain and said chain is adapted to be supported by said article supporting devices.

Signed at St. Louis, Missouri, this 8th day of July, 1921.

AUGUST J. REBSTOCK.